(12) United States Patent
Watanabe et al.

(10) Patent No.: US 12,499,344 B2
(45) Date of Patent: *Dec. 16, 2025

(54) METHOD OF EXECUTING CLASSIFICATION PROCESS USING MACHINE LEARNING MODEL, INFORMATION PROCESSING DEVICE, AND NON-TRANSITORY COMPUTER-READABLE MEDIUM STORING COMPUTER PROGRAM

(71) Applicant: SEIKO EPSON CORPORATION, Tokyo (JP)

(72) Inventors: Ryoki Watanabe, Matsumoto (JP); Hikaru Kurasawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 1058 days.

This patent is subject to a terminal disclaimer.

(21) Appl. No.: 17/514,350

(22) Filed: Oct. 29, 2021

(65) Prior Publication Data

US 2022/0138526 A1    May 5, 2022

(30) Foreign Application Priority Data

Oct. 30, 2020   (JP) ................ 2020-182206

(51) Int. Cl.
  *G06N 3/045*  (2023.01)
  *G06N 3/04*   (2023.01)

(52) U.S. Cl.
  CPC ..................... *G06N 3/04* (2013.01)

(58) Field of Classification Search
  CPC ............ G06N 3/04; G06N 3/045; G06N 3/08
  See application file for complete search history.

(56) References Cited

U.S. PATENT DOCUMENTS

| | | |
|---|---|---|
| 6,425,650 B1 | 7/2002 | Walker et al. |
| 10,387,740 B2 | 8/2019 | Yang et al. |
| 11,275,928 B2 | 3/2022 | Rassool |

(Continued)

FOREIGN PATENT DOCUMENTS

| | | |
|---|---|---|
| JP | 2006-154913 A | 6/2006 |
| JP | 2019-055554 A | 4/2019 |

(Continued)

OTHER PUBLICATIONS

Zhou et al "SCSP: Spectral Clustering Filter Pruning with Soft Self-adaption Manners" dated Jun. 14, 2018 and retrieved from arXiv: 1806.05320v1 (Year: 2018).*

(Continued)

*Primary Examiner* — Sanchita Roy
(74) *Attorney, Agent, or Firm* — Oliff PLC

(57) ABSTRACT

A method of making a single processor or a plurality of processors perform classification processing of classification target data using a machine learning model includes the steps of (a) preparing N machine learning models in a memory assuming N as an integer no smaller than 2, and (b) performing the classification processing of the classification target data using the N machine learning models. Each of the N machine learning models is configured so as to classify input data into any of a plurality of classes with learning using training data, and is configured so as to have at least one class different from a class of another of the N machine learning models.

6 Claims, 9 Drawing Sheets

(56) References Cited

U.S. PATENT DOCUMENTS

| | | |
|---|---|---|
| 2002/0156754 A1 | 10/2002 | Swimm |
| 2003/0132366 A1 | 7/2003 | Gao et al. |
| 2007/0263265 A1 | 11/2007 | Sekine |
| 2012/0148150 A1 | 6/2012 | Takahashi |
| 2013/0127946 A1 | 5/2013 | Kanai |
| 2013/0129143 A1 | 5/2013 | Chen et al. |
| 2015/0339558 A1 | 11/2015 | Kanai |
| 2019/0098142 A1 | 3/2019 | Ozawa |
| 2019/0102701 A1* | 4/2019 | Singaraju .............. G10L 15/063 |
| 2019/0260902 A1 | 8/2019 | Eiyama |
| 2019/0360942 A1 | 11/2019 | Kano et al. |
| 2020/0210721 A1* | 7/2020 | Goel ...................... G06V 10/82 |
| 2020/0249892 A1 | 8/2020 | Shikagawa et al. |
| 2020/0269573 A1 | 8/2020 | Lin et al. |
| 2020/0276835 A1 | 9/2020 | Kasamatsu et al. |
| 2020/0285934 A1* | 9/2020 | Hinton ..................... G06N 3/04 |
| 2020/0314276 A1 | 10/2020 | Igarashi et al. |
| 2020/0314290 A1 | 10/2020 | Yokouchi |
| 2020/0336802 A1 | 10/2020 | Russell et al. |
| 2021/0223031 A1 | 7/2021 | Lee et al. |
| 2021/0280169 A1 | 9/2021 | Suzuki et al. |
| 2022/0092369 A1 | 3/2022 | Yokouchi |
| 2022/0100477 A1 | 3/2022 | Mosko et al. |
| 2022/0131998 A1 | 4/2022 | Morovic et al. |

FOREIGN PATENT DOCUMENTS

| | | |
|---|---|---|
| JP | 2019-204321 A | 11/2019 |
| JP | 2020-121503 A | 8/2020 |

OTHER PUBLICATIONS

Ansari et al., "Mixed Integer Ink Selection for Spectral Reproduction", Nov. 2020, pp. 1-16. (Year: 2020).

Bianchi et al., "Spectral Clustering with Graph Neural Networks for Graph Pooling", Jun. 3, 2020, arXiv:1907.00481v3, pp. 1-13. (Year: 2020).

Devassy et al., "Comparison of Ink Classification Capabilities of Classic Hyperspectral Similarity Features" 2019, pp. 25-30.(Year 2019).

Ferreira et al., "Data-Driven Feature Characterization Techniques for Laser Printer Attribution", 2017, pp. 1860-1873. (Year: 2017).

Huang et al., "Ultra-Scalable Spectral Clustering and Ensemble Clustering", Mar. 5, 2019, arXiv:1903.01057v2, pp. 1-15. (Year: 2019).

Joshi et al.,"Source Printer Identification from Document Images Acquired using Smartphone"Mar. 27, 2020, pp. 1-10. (Year:2020).

Kumar et al., "Discrimination of Various Paper Types Using Diffuse Reflectance Ultraviolet-Visible Near-Infrared (UV-Vis-NIR) Spectroscopy: Forensic Application to Questioned Documents", 2015, Applied Spectroscopy, pp. 714-720. (Year: 2015).

Li et al., "Global Node Attentions via Adaptive Spectral Filters", Sep. 28, 2020, Anonymous (OpenReview), pp. 1-16. (Year: 2020).

Monakhova et al., "Spectral DiffuserCam: Lensless Snapshot Hyperspectral Imaging with a Spectral Filter Array", Oct. 2020, pp. 1298-1307. (Year: 2020).

Nebouy et al., "Prediction of the spectral reflectance of laser-generated color prints by combination of an optical model and learning methods", Aug. 19, 2015, pp. 1661-1671. (Year 2015).

Saragadam et al., "Programmable Spectrometry: Per-Pixel Classification of Materials using Learned Spectral Filters", May 13, 2019, arXiv:1905.04815v1, pp. 1-12. (Year: 2019).

Shaham et al., "SpectralNet: Spectral Clustering using Deep Neural Networks", Apr. 4, 2018, arXiv:1801.01587, pp. 1-21. (Year: 2018).

Shi et al., "Deep Multispectral Painting Reproduction via Multi-Layer, Custom-Ink Printing", Nov. 2018, pp. 1-15. (Year: 2018).

Zhao et al., "Hyperspectral Imaging with Random Printed Mask", 2019, pp. 10149-10157. (Year: 2019).

Zuffi, Silvia, "Spectral-based Printer Modeling and Characterization", 2005, pp. 1-9. (Year: 2005).

* cited by examiner

*FIG. 7*

| No. | LAYER NAME | LABEL Lb | KNOWN FEATURE SPECTRUM KSp |
|---|---|---|---|
| 1 | ConvVN1 | 1 | ................................ |
| 2 | ConvVN1 | 1 | ................................ |
| ... | ... | ... | ................................ |
| N1_1max | ConvVN1 | 1 | ................................ |
| 1 | ConvVN1 | 2 | ................................ |
| 2 | ConvVN1 | 2 | ................................ |
| ... | ... | ... | ................................ |
| N1_2max | ConvVN1 | 2 | ................................ |
| ... | ... | ... | ................................ |
| ... | ... | ... | ................................ |
| N1_n1max | ConvVN1 | n1 | ................................ |

KS1_ConvVN1, KS1_ConvVN2, KS1_ClassVN

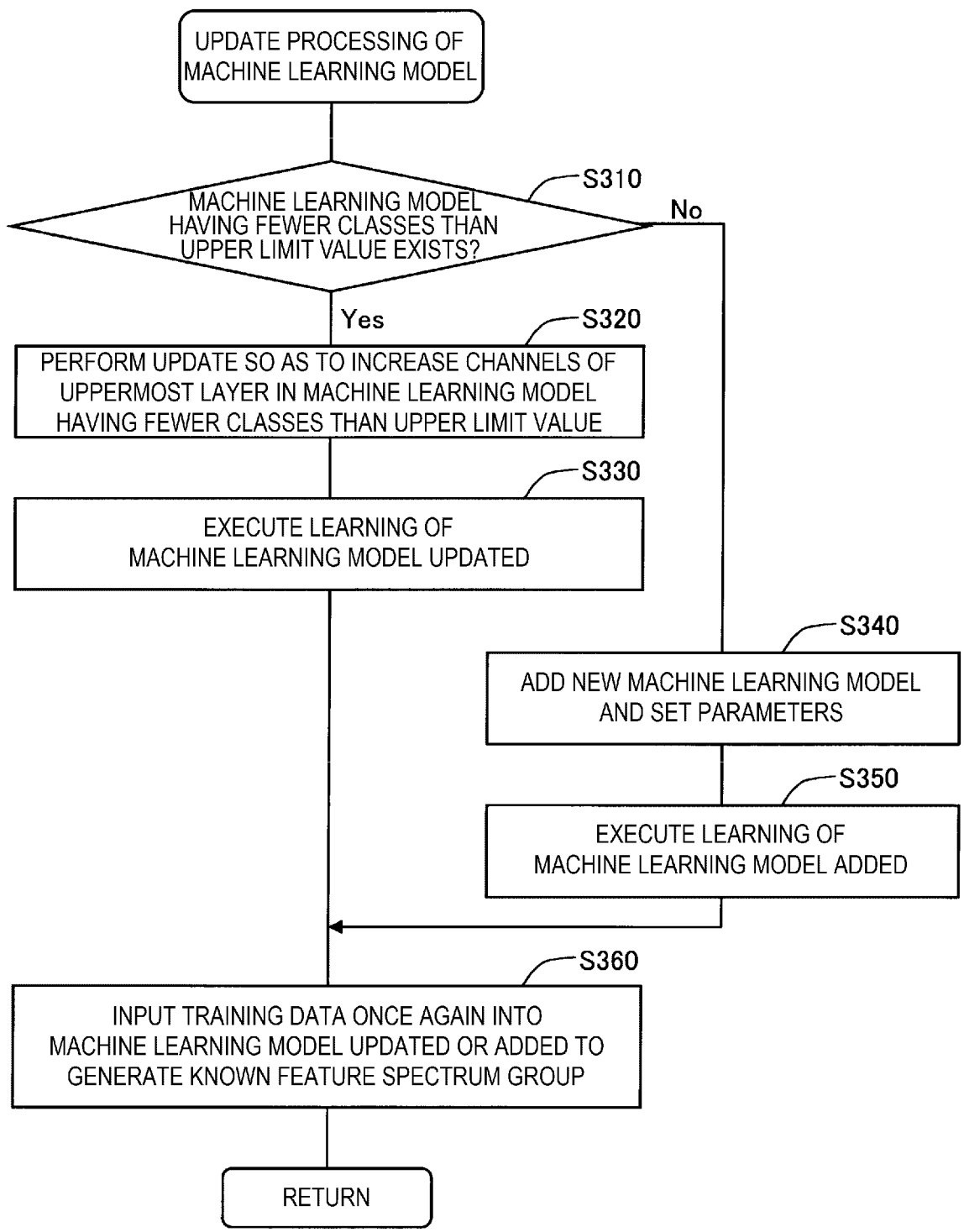

METHOD OF EXECUTING CLASSIFICATION PROCESS USING MACHINE LEARNING MODEL, INFORMATION PROCESSING DEVICE, AND NON-TRANSITORY COMPUTER-READABLE MEDIUM STORING COMPUTER PROGRAM

The present application is based on, and claims priority from JP Application Serial Number 2020-182206, filed Oct. 30, 2020, the disclosure of which is hereby incorporated by reference herein in its entirety.

BACKGROUND

1. Technical Field

The present disclosure relates to a method of executing a classification process using a machine learning model, an information processing device, and a non-transitory computer-readable medium storing a computer program.

2. Related Art

In JP-A-2019-204321, there is disclosed a technology of performing a classification of input data using a VAE (Variational Autoencoder). In this technology, by building the VAE for every class to be judged, and comparing input data and data output from one of the VAE with each other, whether or not the input data falls under the class corresponding to the VAE is judged. When the input data fails to fall under the class corresponding to the VAE, the judgment is executed once again using another of the VAE.

However, in the technology described above, since it is necessary to build the VAE class by class, there is a problem that an amount of throughput is large, and the operation requires a lot of time.

SUMMARY

According to a first aspect of the present disclosure, there is provided a method of making a single processor or a plurality of processors perform classification processing of classification target data using a machine learning model. This method includes (a) preparing N machine learning models in a memory assuming N as an integer no smaller than 2, wherein each of the N machine learning models is configured so as to classify input data into any one of a plurality of classes due to learning using training data, and is configured so as to have at least one class different from a class of another of the N machine learning models, and (b) performing the classification processing of the classification target data using the N machine learning models.

According to a second aspect of the present disclosure, there is provided an information processing device configured to perform classification processing of classification target data using a machine learning model. This information processing device includes a memory configured to store N machine learning models assuming N as an integer no smaller than 2, and a single processor or a plurality of processors configured to perform a calculation using the N machine learning models. Each of the N machine learning models is configured so as to classify input data into any of the plurality of classes with learning using training data, and is configured so as to have at least one class different from a class of another of the N machine learning models. The single processor or the plurality of processors is configured so as to perform the classification processing of the classification target data using the N machine learning models.

According to a third aspect of the present disclosure, there is provided a non-transitory computer-readable storage medium storing a computer program making a single processor or a plurality of processors perform classification processing of classification target data using a machine learning model. The machine learning models include N machine learning models assuming N as an integer no smaller than 2, each of the N machine learning models is configured so as to classify input data into any one of a plurality of classes due to learning using training data, and is configured so as to have at least one class different from a class of another of the N machine learning models, the computer program includes making the single processor or the plurality of processors perform the classification processing of the classification target data using the N machine learning models.

BRIEF DESCRIPTION OF THE DRAWINGS

FIG. 7 is an explanatory diagram showing a configuration of a known feature spectrum group.

FIG. 9 is a flowchart showing a processing procedure of an update processing of a machine learning model.

DESCRIPTION OF EXEMPLARY EMBODIMENTS

A. Embodiment

Figure 1:
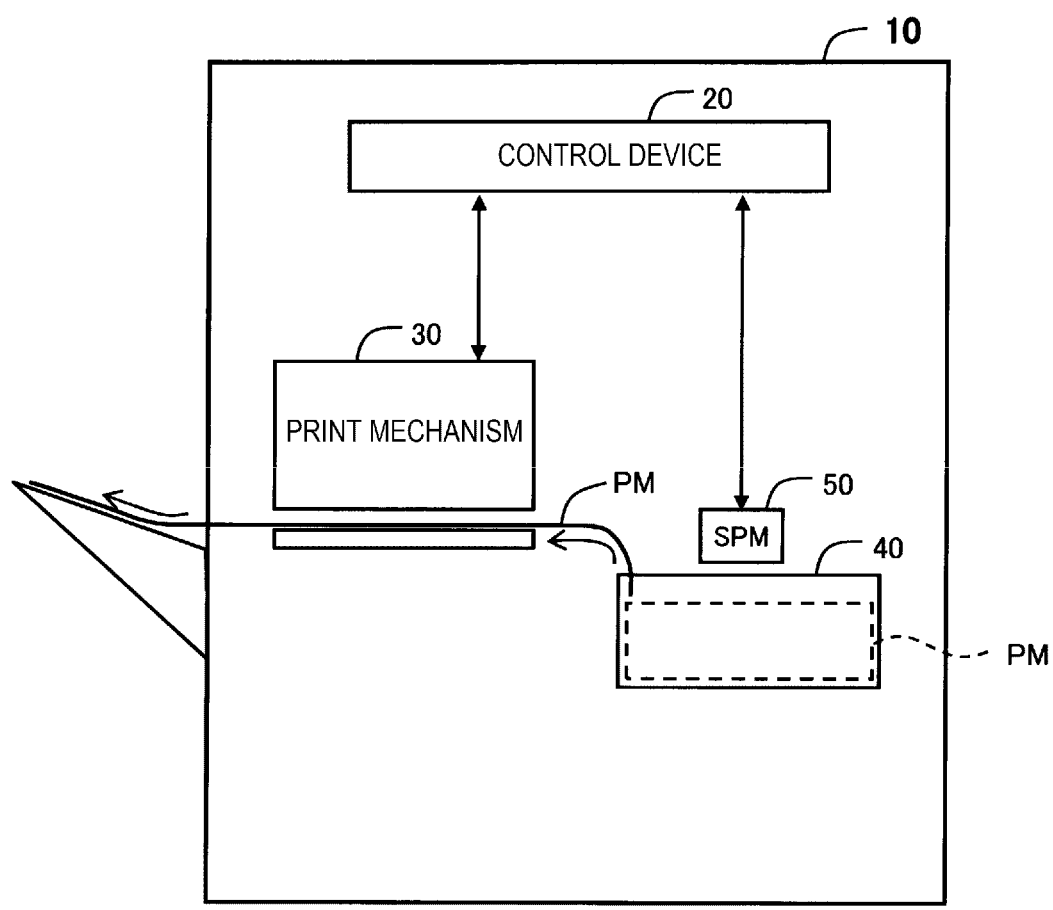
FIG. 1 is a block diagram of an information processing device in an embodiment.

FIG. 1 is a block diagram showing a function of a printer 10 as an information processing device according to an embodiment. The printer 10 has a control device 20, a print mechanism 30, a print medium holder 40, and a spectroscopic measurement instrument 50. The print medium holder 40 houses a print medium PM. The spectroscopic measurement instrument 50 performs a spectroscopic measurement of the print medium PM housed in the print medium holder 40 to obtain spectroscopic spectrum data. The spectroscopic measurement instrument 50 is provided with, for example, a variable wavelength interference spectroscopic filter and a monochrome image sensor. The spectroscopic spectrum data obtained by the spectroscopic measurement instrument 50 is used as the input data to a machine learning model described later or classification target data. As described later, the control device 20 executes a classification process of the spectroscopic spectrum data using the machine learning model to perform a classification on which one of classes the print medium PM falls into. The "class of the print medium PM" means a type of the print medium PM. The control device 20 controls the print mechanism 30 to perform printing in an appropriate print condition corresponding to the type of the print medium PM.

It should be noted that the present disclosure can also be applied to a variety of information processing devices other than the printer 10.

Figure 2:
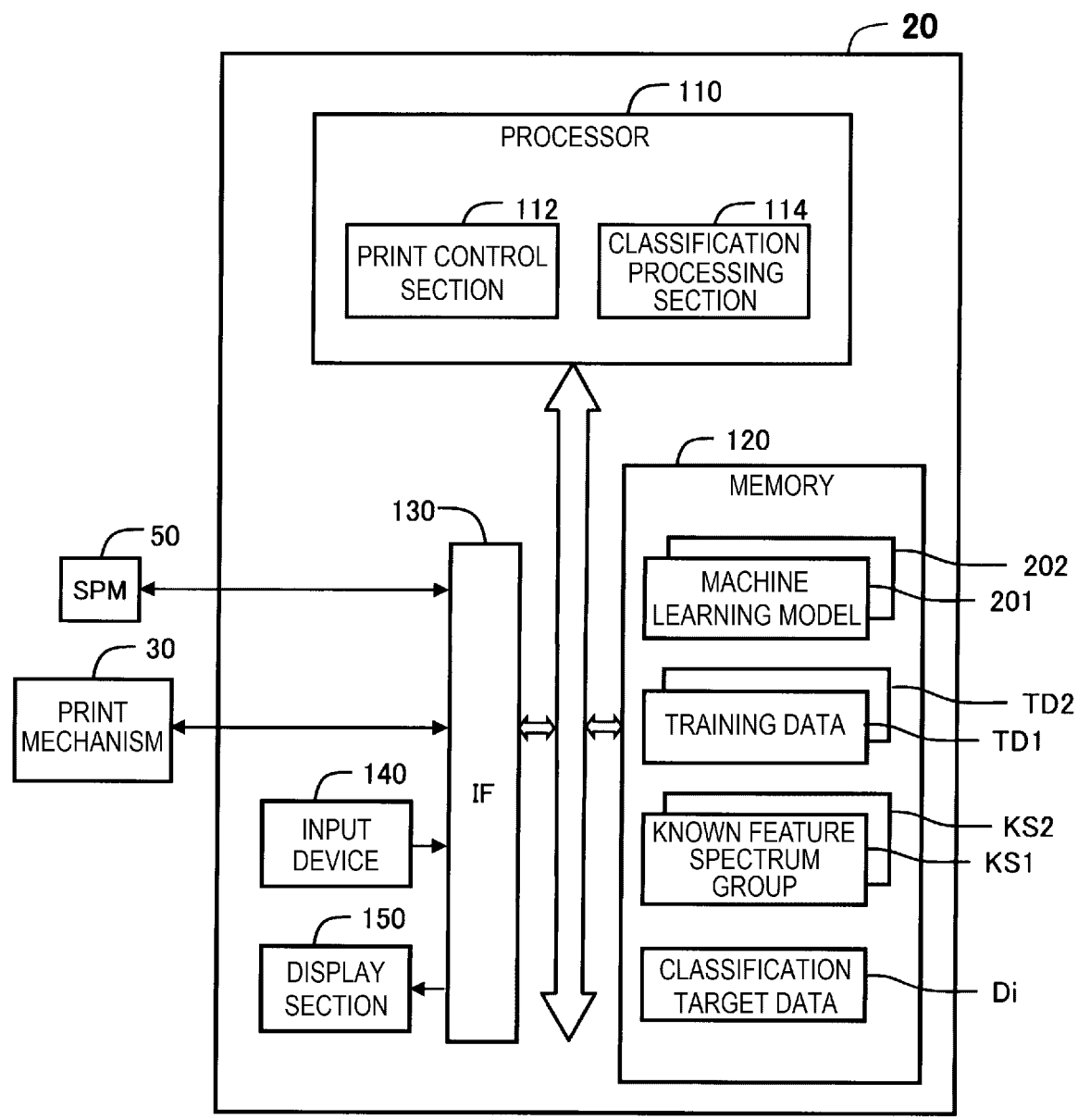
FIG. 2 is a block diagram of a control device.

FIG. 2 is a block diagram showing a function of the control device 20. The control device 20 has a processor 110, a memory 120, an interface circuit 130, an input device 140, and a display section 150, wherein the input device 140 and the display section 150 are coupled to the interface circuit 130. Although not limited thereto, the processor 110 not only has a function of executing processing described in detail below, but also has a function of displaying data obtained by the processing and data generated in the process of the processing on the display section 150, for example. To the interface circuit 130, there are also coupled the spectroscopic measurement instrument 50 and the print mechanism 30.

The processor 110 functions as a print control section 112 for performing control of the print mechanism 30, and also functions as a classification processing section 114 for executing a classification process of the input data. These sections 112, 114 are realized by the processor 110 executing a computer program stored in the memory 120. It should be noted that it is possible to realize these sections 112, 114 with a hardware circuit. The processor in the present specification is a term including such a hardware circuit. Further, the processor for executing the classification process can also be a processor included in a remote computer coupled to the printer 10 via a network. The memory 120 stores a plurality of machine learning models 201, 202, a plurality of training data groups TD1, TD2, a plurality of known feature spectrum groups KS1, KS2, and classification target data Di. The machine learning models 201, 202 are used for an operation by the classification processing section 114. A configuration example and an operation of the machine learning models 201, 202 will be described later. The training data groups TD1, TD2 are each an aggregate of the spectroscopic spectrum data with a label to be used for learning of the machine learning models 201, 202. The known feature spectrum groups KS1, KS2 are aggregates of the feature spectra obtained when inputting the training data groups TD1, TD2 once again to the machine learning models 201, 202 having already been learned, respectively. The feature spectrum will be described later. The classification target data Di is the spectroscopic spectrum data of a new print medium PM to be a processing object of the classification process.

Figure 3:
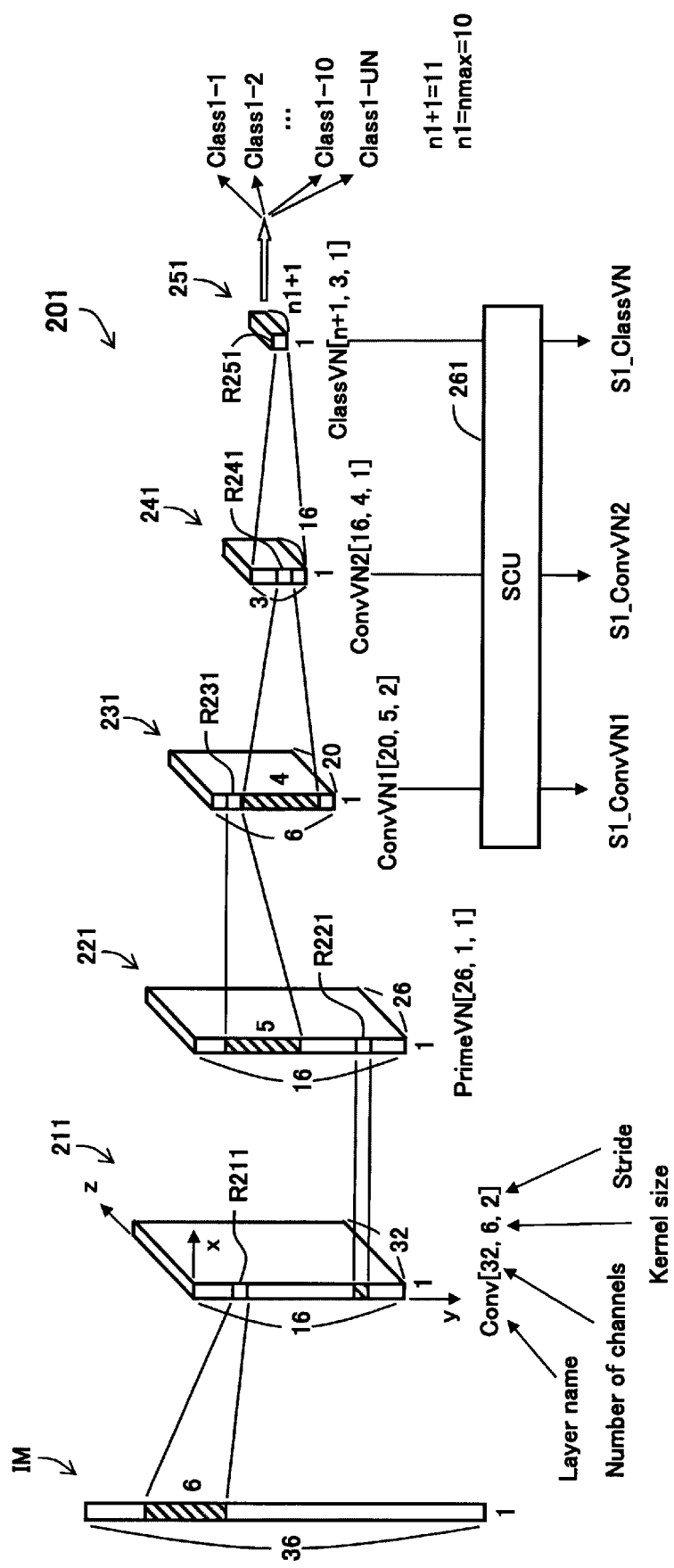
FIG. 3 is an explanatory diagram showing a configuration of a first machine learning model.

FIG. 3 is an explanatory diagram showing a configuration of the first machine learning model 201. The machine learning model 201 is provided with a convolution layer 211, a primary vector neuron layer 221, a first convolution vector neuron layer 231, a second convolution vector neuron layer 241, and a classification vector neuron layer 251 in this order from an input data IM side. Out of these five layers 211 through 251, the convolution layer 211 is the lowest layer, and the classification vector neuron layer 251 is the highest layer. In the following description, the layers 211 through 251 are also referred to as a "Cony layer 211," a "PrimeVN layer 221," a "ConvVN1 layer 231," a "ConvVN2 layer 241," and a "ClassVN layer 251," respectively.

In the present embodiment, the input data IM is the spectroscopic spectrum data, and is therefore one-dimensional array data. For example, the input data IM is data obtained by extracting 36 representative values every 10 nm from the spectroscopic spectrum data in a range of 380 nm through 730 nm. It should be noted that it is possible to use two-dimensional array data such as an image as the input data IM.

Although there are used the two convolution vector neuron layers 231, 241 in the example shown in FIG. 3, the number of the convolution vector neuron layers is arbitrary, and it is possible to omit the convolution vector neuron layers. It should be noted that it is preferable to use one or more convolution vector neuron layers.

The machine learning model 201 shown in FIG. 3 further has a similarity calculation section 261 for generating similarities. The similarity calculation section 261 is capable of calculating similarities S1_ConvVN1, S1_ConvVN2, and S1_ClassVN described later from output of the ConvVN1 layer 231, the ConvVN2 layer 241, and the ClassVN layer 251, respectively. It should be noted that it is possible to omit the similarity calculation section 261.

The configurations of the respective layers 211 through 251 can be described as follows.

Description of Configuration of First Machine Learning Model 201

Cony layer 211: Conv[32,6,2]
PrimeVN layer 221: PrimeVN[26,1,1]
ConvVN1 layer 231: ConvVN1[20,5,2]
ConvVN2 layer 241: ConvVN2[16,4,1]
ClassVN layer 251: ClassVN[n1+1,3,1]
Vector Dimension VD: VD=16

In the description of these layers 211 through 251, the character string before the parenthesis is a layer name, the numbers in the parentheses represent the number of channels, a kernel size, and a stride in sequence. For example, the layer name of the Conv layer 211 is "Cony," the number of channels is 32, the kernel size is 1×6, and the stride is 2. In FIG. 3, these descriptions are shown below each of the layers. The rectangular shape with hatching drawn in each of the layers represents the kernel used when calculating an output vector of an adjacent upper layer. In the present embodiment, since the input data IM is one-dimensional array data, the kernel also has a one-dimensional array. It should be noted that the values of the parameters used in the descriptions of the layers 211 through 251 are illustrative only, and can arbitrarily be changed.

The Cony layer 211 is a layer formed of a scalar neuron. The other four layers 221 through 251 are each a layer formed of a vector neuron. The vector neuron is a neuron input and output of which are each a vector. In the above description, the dimension of the output vector of an individual vector neuron is constantly 16. In the following description, a term "node" is used as a broader concept of the scalar neuron and the vector neuron.

In FIG. 3, there are shown a first axis x and a second axis y for defining plane coordinates of a node array, and a third axis z representing a depth with respect to the Cony layer 211. Further, there is shown the fact that the sizes in the x, y, and z directions of the Cony layer 211 are 1, 16, and 32, respectively. The size in the x direction and the size in the y direction are each called a "resolution." In the present embodiment, the resolution in the x direction is constantly 1. The size in the z direction is the number of channels. These three axes x, y, and z are also used as coordinate axes representing a position of each node in the other layers. It should be noted that in FIG. 3, illustration of these axes x, y, and z is omitted in the layers other than the Cony layer 211.

As is known well, the resolution W1 in the y direction after the convolution is provided by the following formula.

$$W1 = \text{Ceil}\{(W0 - Wk + 1)/S\} \quad (1)$$

Here, W0 represents the resolution before the convolution, Wk represents the kernel size, S represents the stride, and Ceil{X} represents a function for performing an operation of rounding X up.

The resolution of each of the layers shown in FIG. 3 is an example assuming the resolution in the y direction of the input data IM as 36, and the actual resolution of each of the layers is arbitrarily changed in accordance with the size of the input data IM.

The ClassVN layer 251 has (n1+1) channels. In the example shown in FIG. 3, (n1+1)=11 is set. From these channels, judgment values Class1-1 through Class1-10 with respect to a plurality of known classes, and a judgment value Class1-UN representing an unknown class are output. The class which has the largest value of these judgment values Class1-1 through Class1-10, and Class1-UN corresponds to the class to which the input data IM belongs. In general, n1 is an integer no smaller than 1, and is the number of known classes which can be classified using the first machine learning model 201. In any one of the machine learning models, it is preferable to set an upper limit value $n_{max}$ in advance to the number n1 of the known classes which can be classified. In the example shown in FIG. 3, the number n1 of the known classes is equal to 10 as the upper limit value $n_{max}$. The upper limit value $n_{max}$ can be a theoretical upper limit value which can satisfy a predetermined classification accuracy, or can also be an operational upper limit value having a smaller value than the theoretical upper limit value described above. Basically, the operational upper limit value brings in higher classification accuracy than in the theoretical upper limit value. Further, the upper limit value $n_{max}$ can independently be set in the plurality of machine learning models 201, 202, and can be set to respective values different from each other.

It should be noted that it is possible to omit the judgment value Class1-UN representing the unknown class. In this case, when the largest value of the judgment values Class1-1 through Class1-10 with respect to the known classes is smaller than a predetermined threshold value, it is judged that the class of the input data IM is unknown.

Figure 4:
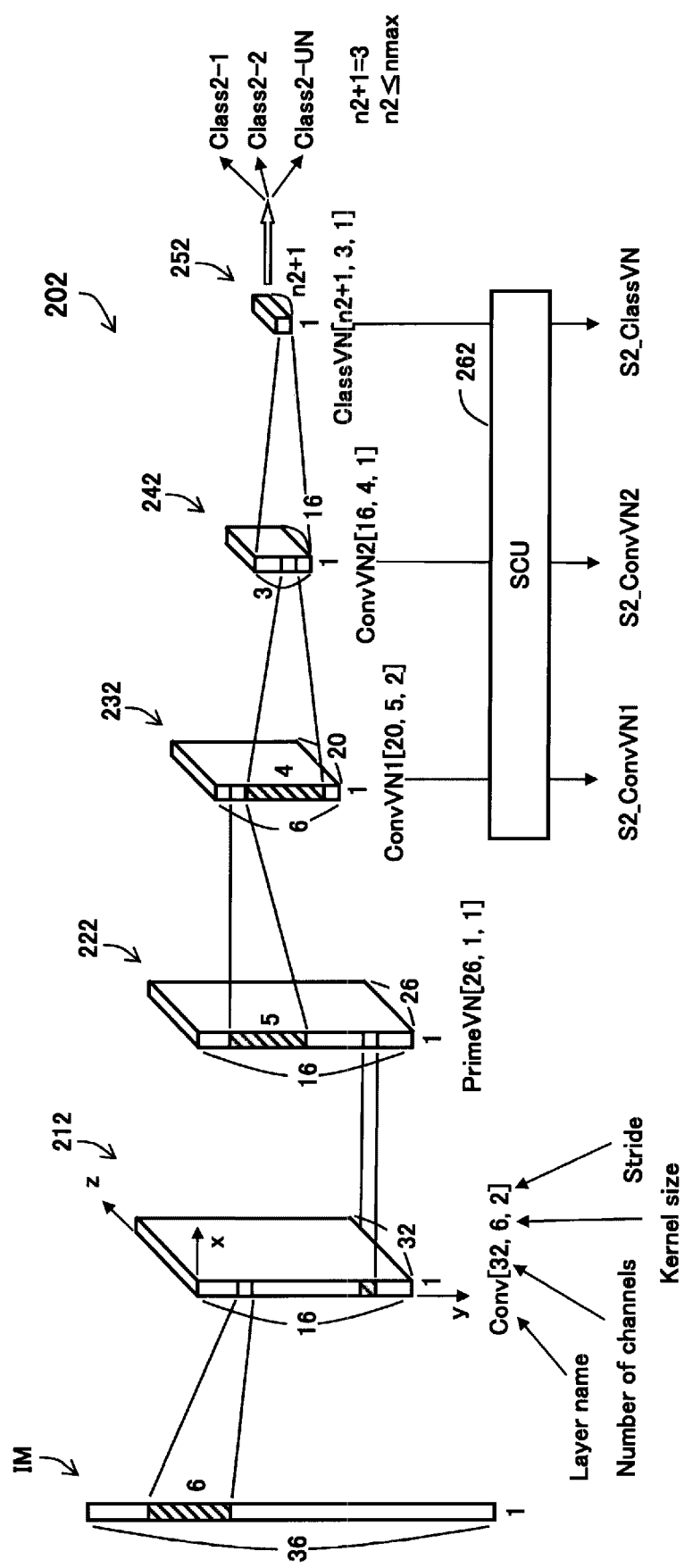
FIG. 4 is an explanatory diagram showing a configuration of a second machine learning model.

FIG. 4 is an explanatory diagram showing a configuration of the second machine learning model 202. Similarly to the first machine learning model 201, the machine learning model 202 has a Conv layer 212, a PrimeVN layer 222, a ConvVN1 layer 232, a ConvVN2 layer 242, a ClassVN layer 252, and a similarity calculation section 262.

The configurations of the respective layers 212 through 252 can be described as follows.
Description of Configuration of Second Machine Learning Model 202
Cony layer 212: Conv[32,6,2]
PrimeVN layer 222: PrimeVN[26,1,1]
ConvVN1 layer 232: ConvVN1[20,5,2]
ConvVN2 layer 242: ConvVN2[16,4,1]
ClassVN layer 252: ClassVN[n2+1,3,1]
Vector Dimension VD: VD=16

As can be understood when comparing between FIG. 3 and FIG. 4, out of the layers 212 through 252 of the second machine learning model 202, the lower four layers 212 through 242 have the same configurations as those of the layers 211 through 241 of the first machine learning model 201, respectively. In contrast, the uppermost layer 252 of the second machine learning model 202 is different only in the number of channels from the uppermost layer 251 of the first machine learning model 201. In the example shown in FIG. 4, the ClassVN layer 252 has (n2+1) channels, wherein (n2+1)=3 is set. From these channels, judgment values Class2-1 through Class2-2 with respect to a plurality of known classes, and judgment value Class2-UN representing an unknown class are output. Also in the second machine learning model 202, it is preferable that the same upper limit value $n_{max}$ as in the first machine learning model 201 is set to the number n2 of known classes. In the example shown in FIG. 4, the number n2 of the known classes is smaller than the upper limit value $n_{max}$. In this case, it is expressed that the second machine learning model 202 "has a smaller number of classes than the upper limit value $n_{max}$." It should be noted that it is possible to set the upper limit value $n_{max}$ of the number of classes to respective values different from each other in the plurality of machine learning models 201, 202.

The second machine learning model 202 is configured so as to have at least one known class different from that in the first machine learning model 201. Further, since the classes which can be classified are different between the first machine learning model 201 and the second machine learning model 202, the values of the elements of the kernel are also different therebetween. In the present disclosure, assuming N as an integer no smaller than 2, any one of the N machine learning models is configured so as to have at least one known class different from those in other machine learning models.

Figure 5:
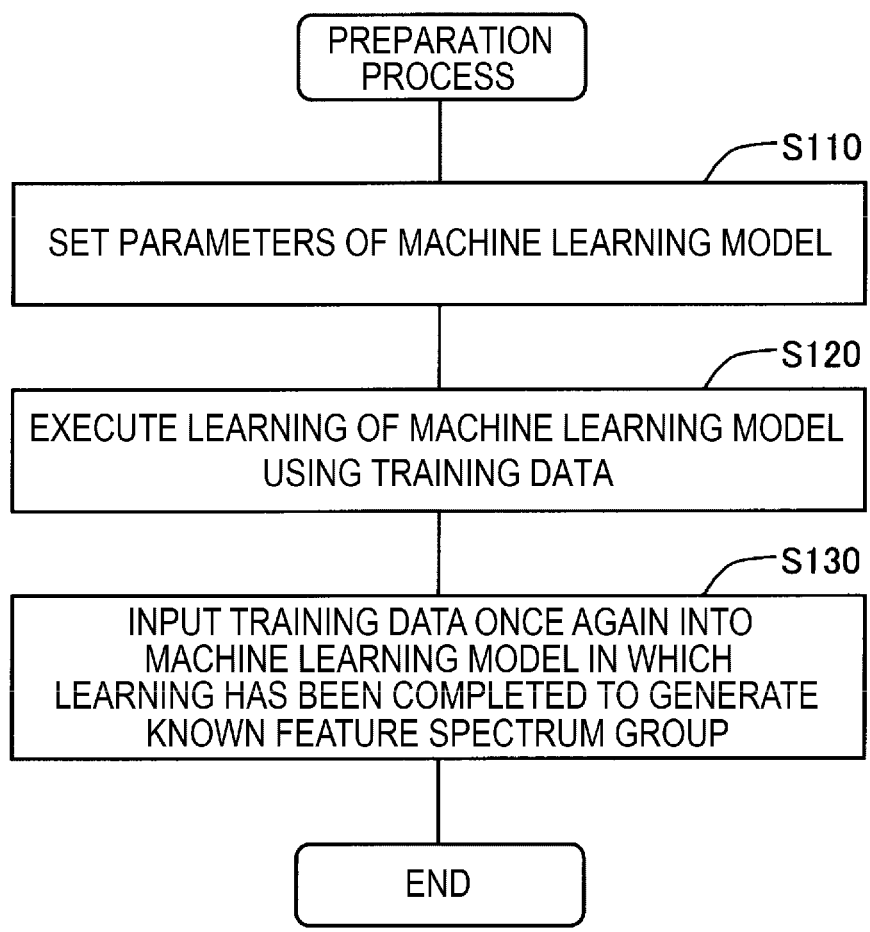
FIG. 5 is a flowchart showing a processing procedure of a preparation process.

FIG. 5 is a flowchart showing a processing procedure of a preparation process of the machine learning model. In the step S110, the user prepares the machine learning model to be used in the classification process, and sets parameters thereof. In the present embodiment, the two machine learning models 201, 202 shown in FIG. 3 and FIG. 4 are prepared, and the parameters thereof are set. It should be noted that in the step S110, it is possible to prepare a single machine learning model alone, or it is also possible to prepare three or more machine learning models. In the step S120, the classification processing section 114 executes learning of the machine learning models 201, 202 using the training data groups TD1, TD2. The individual training data is provided with a label in advance. For example, since the first machine learning model 201 has 10 known classes, the training data thereof is provided with a label with any one of values of 1 through 10. When the learning is completed, the machine learning models 201, 202 in which the learning has been completed are stored in the memory 120.

In the step S130, the classification processing section 114 inputs the plurality of training data groups TD1, TD2 once again into the machine learning models 201, 202 in which the learning has been completed to generate the known feature spectrum groups KS1, KS2. The known feature spectrum groups KS1, KS2 are each an aggregate of the feature spectra described below. Hereinafter, there will be described a method of generating the known feature spectrum group KS1 made to correspond mainly to the machine learning model 201.

Figure 6:
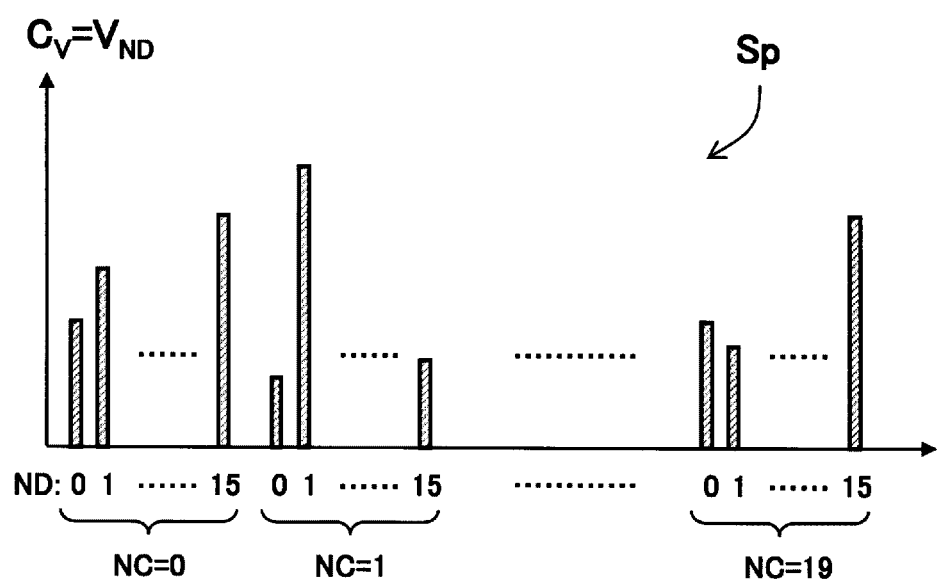
FIG. 6 is an explanatory diagram showing a feature spectrum.

FIG. 6 is an explanatory diagram showing the feature spectrum Sp which can be obtained by inputting arbitrary input data into the machine learning model 201 in which the learning has been completed. Here, the feature spectrum Sp obtained from the output of the ConvVN1 layer 231 will be described. The horizontal axis in FIG. 6 is a spectral position represented by a combination of an element number ND of an output vector of a node at one plan position (x,y) in the ConvVN1 layer 231, and a channel number NC. In the present embodiment, since the vector dimension of the node is 16, the element numbers ND of the output vector takes 16 values from 0 to 15. Further, since the number of channels in the ConvVN1 layer 231 is 20, the channel number NC takes 20 values from 0 to 19.

The vertical axis in FIG. 6 represents a feature value $C_V$ at each of the spectral positions. In this example, the feature value $C_V$ is equal to the value $V_{ND}$ of each element of the output vector. It should be noted that as the feature value $C_V$, it is possible to use a value obtained by multiplying the value $V_{ND}$ of each element of the output vector by an activation value described later, or it is possible to use the activation value without modification. In the latter case, the number of the feature values $C_V$ included in the feature spectrum Sp is equal to the number of channels, and is 20. It should be noted that the activation value is a value corresponding to the vector length of the output vector of the node.

The number of the feature spectra Sp obtained from the output of the ConvVN1 layer 231 with respect to a single input data is equal to the number of the plan positions (x,y) of the ConvVN1 layer 231, and is therefore 1×6=6. Similarly, three feature spectra Sp can be obtained from the output of the ConvVN2 layer 241, and one feature spectrum Sp can be obtained from the output of the ClassVN layer 251 with respect to a single input data.

The similarity calculation section 261 calculates the feature spectrum Sp shown in FIG. 6 and then registers the feature spectrum Sp thus calculated on the known feature spectrum group KS1 when the training data group TD1 is input once again into the machine learning model 201 in which the learning has been completed.

FIG. 7 is an explanatory diagram showing a configuration of the known feature spectrum group KS1. In this example, the known feature spectrum group KS1 includes a known feature spectrum group KS1_ConvVN1 obtained from the output of the ConvVN1 layer 231, a known feature spectrum group KS1_ConvVN2 obtained from the output of the ConvVN2 layer 241, and a known feature spectrum group KS1_ClassVN obtained from the output of the ClassVN layer 251.

An individual record of the known feature spectrum group KS1_ConvVN1 includes a record number, a layer name, a label Lb, and the known feature spectrum KSp. The known feature spectrum KSp is the same as the feature spectrum Sp shown in FIG. 6 obtained in accordance with the input of the training data. In the example shown in FIG. 7, by inputting the training data group TD1 into the machine learning model 201 in which the learning has been completed, the known feature spectrum KSp associated with a value of the individual label Lb is generated from the output of the ConvVN1 layer 231, and is then registered. For example, N1_1max pieces of known feature spectra KSp are registered so as to be associated with the label Lb=1, N1_2max pieces of known feature spectra KSp are registered so as to be associated with the label Lb=2, and N1_n1max pieces of known feature spectra KSp are registered so as to be associated with the label Lb=n1. N1_1max, N1_2max, N1_n1max are each an integer no smaller than 2. As described above, the individual labels Lb correspond to the known classes different from each other. Therefore, it can be understood that the individual feature spectra KSp in the known feature spectrum group KS1_ConvVN1 are registered so as to be associated with one of the known classes. The same applies to the other known feature spectrum groups KS1_ConvVN2, KS1_ClassVN.

It should be noted that the training data used in the step S130 is not required to be the same as the plurality of training data groups TD1, TD2 used in the step S120. It should be noted that when a part or the whole of the plurality of training data groups TD1, TD2 used in the step S120 is also used in the step S130, there is an advantage that there is no need to prepare new training data.

Figure 8:
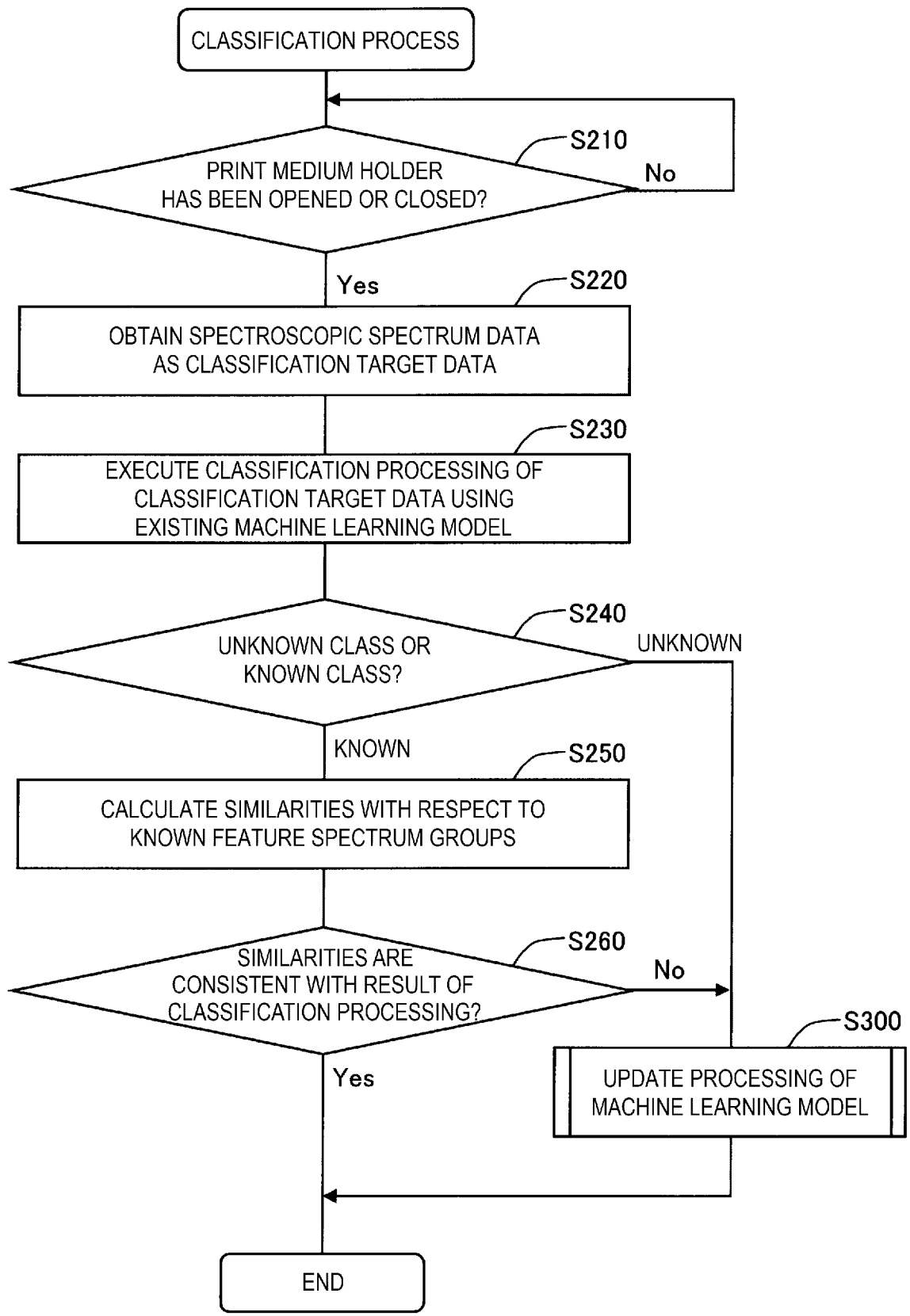
FIG. 8 is a flowchart showing a processing procedure of a classification process.

FIG. 8 is a flowchart showing a processing procedure of a classification process using the machine learning model in which the learning has been completed. In the step S120, the classification processing section 114 judges whether or not the print medium holder 40 has been opened or closed, and waits until opening or closing occurs. This judgment is performed in accordance with an output signal from an opening-closing switch not shown disposed in the print medium holder 40. When the print medium holder 40 has been opened or closed, the process proceeds to the step S130, and the classification processing section 114 makes the spectroscopic measurement instrument 50 perform the spectroscopic measurement of the print medium PM to thereby obtain the spectroscopic spectrum data. The spectroscopic spectrum data becomes the classification target data Di as an object of the classification processing.

In the step S230, the classification processing section 114 inputs the classification target data Di into the existing machine learning models 201, 202 in which the learning has been completed, and then executes the classification processing of the classification target data Di. In this case, it is possible to use either one of a first processing method of sequentially using the plurality of machine learning models 201, 202 one by one, and a second processing method of using the plurality of machine learning models 201, 202 at the same time. In the first processing method, first, the classification processing is executed using one machine learning model 201, and when it has been judged that the classification target data Di belongs to an unknown class as a result, the classification processing is executed using the other machine learning model 202. In the second processing method, the classification processing with respect to the same classification target data Di in parallel using the two machine learning models 201, 202 at the same time, and the classification processing section 114 combines the processing results with each other. According to an experiment by the inventors of the present disclosure, the second processing method requires shorter processing time compared to the first processing method, and is therefore more preferable.

In the step S240, the classification processing section 114 judges whether the classification target data Di belongs to un unknown class or a known class from the result of the classification processing in the step S230. When the classification target data Di belongs to the unknown class, the process proceeds to the step S300 described later, and an update processing of the machine learning model is performed. In contrast, when the classification target data Di belongs to the known class, the process proceeds to the step S250.

In the step S250, the similarity to the known feature spectrum group is calculated using one machine learning model in which it has been judged that the classification target data Di belongs to the known class out of the plurality of machine learning models 201, 202. For example, when it has been judged by the processing of the first machine learning model 201 that the classification target data Di belongs to the known class, the similarity calculation section 261 thereof calculates the similarities S1_ConvVN1, S1_ConvVN2, and S1_ClassVN with respect to the known feature spectrum group KS1 based on the output of the ConvVN1 layer 231, the ConvVN2 layer 241, and the ClassVN layer 251, respectively. In contrast, when it has been judged by the processing of the second machine learning model 202 that the classification target data Di belongs to the known class, the similarity calculation section 262 thereof calculates the similarities S2_ConvVN1, S2_ConvVN2, and S2_ClassVN with respect to the known feature spectrum group KS2. A method of calculating the similarity S1_ConvVN1 based on the output of the ConvVN1 layer 231 of the first machine learning model 201 will hereinafter be described.

The similarity S1_ConvVN1 can be calculated using, for example, the following formula.

$$S1\_ConvVN1(Class)=\max[G\{Sp(i,j),KSp(Class,k)\}]$$

Here, "Class" represents an ordinal number with respect to a plurality of classes, $G\{a,b\}$ represents a function for obtaining the similarity between a and b, $Sp(i,j)$ represents the feature spectra in all of the plan positions (i,j) obtained in accordance with the classification target data Di, KSp (Class,k) represents all of the known feature spectra associated with the ConvVN1 layer 231 and a specific "Class," and max[X] represents a logical operation for taking a maximum value of X. In other words, the similarity S1_ConvVN1 is a maximum value of the similarities calculated between each of the feature spectra $Sp(i,j)$ in all of the plan positions (i,j) of the ConvVN1 layer 231, and each of the known feature spectra KSp(k) corresponding to a specific class. Such a similarity S1_ConvVN1 is obtained with respect to each of the classes corresponding to the plurality of labels Lb. The similarity S1_ConvVN1 represents how similar the classification target data Di is to the feature of each of the classes.

The similarities S1_ConvVN2, S1_ClassVN with respect to the output of the ConvVN2 layer 241 and the ClassVN layer 251 are also generated similarly to the similarity S1_ConvVN1. It should be noted that although it is not necessary to generate all of these three similarities S1_ConvVN1, S1_ConvVN2, and S1_ClassVN, it is preferable to generate one or more of these. In the present disclosure, the layer used for the generation of the similarities is also referred to as a "specific layer."

In the step S260, the classification processing section 114 presents the similarities obtained in the step S250 to the user, and then, the user confirms whether or not the similarities are consistent with the result of the classification processing. Since the similarities S1_ConvVN1, S1_ConvVN2, and S1_ClassVN represent how similar the classification target data Di is to the features of each of the classes, it is possible to confirm right and wrong of the result of the classification processing based on at least one of these similarities S1_ConvVN1, S1_ConvVN2, and S1_ClassVN. For example, it is possible to judge that both parties are not consistent with each other when at least one of the three similarities S1_ConvVN1, S1_ConvVN2, and S1_ClassVN fails to coincide with the result of the classification processing. In another embodiment, it is possible to judge that both parties are not consistent with each other when all of the three similarities S1_ConvVN1, S1_ConvVN2, and S1_ClassVN fail to coincide with the result of the classification processing. In general, it is possible to judge that the both parties are not consistent with each other when a predetermined number of similarities out of the plurality of similarities generated from the output of the plurality of layers fail to coincide with the result of the classification processing. It should be noted that the judgment in the step S260 can be performed by the classification processing section 114.

When the similarities are consistent with the result of the classification processing, the classification processing shown in FIG. 8 is terminated. In contrast, when the similarities are not consistent with the result of the classification processing, the process proceeds to the step S300 described below, and the update processing of the machine learning model is performed.

FIG. 9 is a flowchart showing a processing procedure of the update processing of the machine learning model. In the step S310, there is judged whether or not there is the machine learning model having fewer classes than the upper limit value in the existing machine learning models. Assuming N as an integer no smaller than 2, when there are N existing machine learning models, there is judged whether or not the machine learning model having fewer classes than the upper limit value exists in the N existing machine learning models. It should be noted that the number N of the existing machine learning models can be set to 1. In the present embodiment, there are two existing machine learning models 201, 202 shown in FIG. 3 and FIG. 4, the number of classes is equal to the upper limit value in the first machine learning model 201, and the number of classes is smaller than the upper limit value in the second machine learning model 202. When there is no machine learning model in which the number of classes is smaller than the upper limit value in the existing machine learning models, the process proceeds to the step S340 described later, and a new machine learning model is added. In contrast, when there is the machine learning model in which the number of classes is smaller than the upper limit value, the process proceeds to the step S320, and the machine learning model is updated.

In the step S320, with respect to the machine learning model in which the number of classes is smaller than the upper limit value, the classification processing section 114 updates the machine learning model so as to increment the number of channels of the uppermost layer by one. In the present embodiment, the number of channels (n2+1) of the uppermost layer of the second machine learning model 202 is updated from 3 to 4. In the step S330, the classification processing section 114 performs the learning of the machine learning model updated in the step S320. When performing the learning, the classification target data Di obtained in the step S220 shown in FIG. 8 is used as new training data together with the training data group TD2 for the second machine learning model 202 having been used before. It should be noted that it is preferable to use other plurality of spectroscopic spectrum data obtained from the spectroscopic measurement of the same print medium PM in addition to the classification target data Di obtained in the step S220 as the new training data. Therefore, it is preferable for the spectroscopic measurement instrument 50 to be configured so as to obtain the spectroscopic spectrum data at each of the positions of a single print medium PM. When the learning has been completed in such a manner, the machine learning model 202 thus updated becomes to have the known class corresponding to the classification target data Di. Therefore, it becomes possible to recognize the type of this print medium PM using the machine learning model 202 thus updated.

In the step S340, the classification processing section 114 adds the new machine learning model having the class corresponding to the classification target data Di, and then sets the parameters thereof. It is preferable for this new machine learning model to have the same configuration as that of the first machine learning model 201 shown in FIG. 3 except the number of channels of the uppermost layer. It is preferable for this new machine learning model to be made to have two or more known classes similarly to, for example, the second machine learning model 202 shown in FIG. 4. One of the two or more known classes is a class corresponding to the classification target data Di. Further, it is preferable for at least one of the two or more known classes to be made the same as at least one known class of the existing machine learning model. Making one of the classes of the new machine learning model the same as the known class of the existing machine learning model can be realized by performing the learning of the new machine learning model using the same training data as the training data which has been used in the learning of the existing machine learning model for the existing class. The reason that the two or more known classes are provided to the new machine learning model is that when providing just one known class, there is a possibility that the learning cannot be performed with sufficient accuracy.

It is preferable for the classes of the existing machine learning model to be adopted as the new machine learning model to be selected from, for example, the following classes.

(a) a class corresponding to the spectroscopic spectrum data the highest in similarity to the classification target data Di out of the plurality of known classes in the existing machine learning model (b) a class corresponding to the spectroscopic spectrum data the lowest in similarity to the classification target data Di out of the plurality of known classes in the existing machine learning model (c) a class erroneously judged as the class to which the classification target data Di belongs in the step S240 in FIG. 7 out of the plurality of known classes in the existing machine learning model Among these, when adopting the class of (a) or the class of (c), it is possible to reduce the erroneous judgment in the new machine learning model. Further, when adopting the class of (b), it becomes possible to shorten the learning time of the new machine learning model.

In the step S350, the classification processing section 114 performs the learning of the machine learning model added. In this learning, the classification target data Di obtained in the step S220 in FIG. 8 is used as the new training data. Further, it is preferable to use other plurality of spectroscopic spectrum data obtained from the spectroscopic measurement of the same print medium PM in addition to the classification target data Di obtained in the step S220 as the new training data. Further, when making one or more classes of the new machine learning model the same as the known classes of the existing machine learning model, there is also used the training data which has been used in the learning of the existing machine learning model for that known class.

It should be noted that when the number of the known classes of the second machine learning model 202 reaches the upper limit value, a third machine learning model is added by the steps S340, S350 in FIG. 9. The same applies to a fourth and subsequent machine learning models. As described above, in the present embodiment, assuming N as an integer no smaller than 2, the (N−1) machine learning models become to have an equal number of classes to the upper limit value, and the other machine learning model becomes to have a smaller number of classes than the upper limit value. Further, when it has been judged that the classification target data Di belongs to an unknown class when performing the classification processing with respect to the classification target data Di using the N machine learning models, any one of the following processing is performed.

(1) When the other machine learning model has the smaller number of classes than the upper limit value, a new class corresponding to the classification target data Di is added by performing the learning using the training data including the classification target data Di with respect to the other machine learning model due to the processing in the steps S320, S330.

(2) When the other machine learning model has the equal number of classes to the upper limit value, a new machine learning model having a class corresponding to the classification target data Di is added due to the processing in the steps S340, S350.

According to the above processing, even when the classification of the classification target data Di cannot successfully be performed in the N machine learning models, it becomes possible to perform the classification into the class corresponding to the classification target data Di.

It should be noted that the update processing of the machine learning model shown in FIG. 9 can be performed also when the number of existing machine learning models is one. When the number of existing machine learning models is one means when, for example, the second machine learning model 202 shown in FIG. 4 is not prepared, and the processing shown in FIG. 8 is executed using only the first machine learning model 201 shown in FIG. 3. In this case, the steps S340, S350 in FIG. 9 become the processing of adding the second machine learning model 202 as the new machine learning model. As described above, the processing of adding the second machine learning model 202 as the new machine learning model when it has been judged that the input data belongs to the unknown class in the classification processing performed using only the first machine learning model 201 can also be understood as an example of the processing of preparing the two machine learning models 201, 202.

In the step S360, the classification processing section 114 inputs the training data once again into the machine learning model which has been updated or added to generate the known feature spectrum group. The processing is the same as the processing in the step S230 in FIG. 8, and therefore, the description thereof will be omitted.

As described above, in the present embodiment, assuming N as an integer no smaller than 2, the classification processing is performed using N machine learning models, and therefore, it is possible to execute the processing at high speed compared to when performing the classification processing into a number of classes using a single machine learning model. Further, when the classification of the classification target data cannot successfully be performed using the existing machine learning models, by adding a class to the existing machine learning model, or adding a new machine learning model, it becomes possible to perform the classification into the class corresponding to the classification target data.

It should be noted that although there is used the vector neural network type machine learning model using the vector neurons in the embodiment described above, it is possible to use a machine learning model using the scalar neurons such as a normal convolution neural network instead thereof. It should be noted that the vector neural network type machine learning model is higher in accuracy of the classification processing compared to the machine learning model using the scalar neurons, and is therefore preferable.

B. Method of Calculating Output Vector of Each Layer of Machine Learning Model

The method of calculating the output of each layer in the first machine learning model 201 shown in FIG. 3 is as follows. The same applies to the second machine learning model 202.

Assuming the scalar output of the 1×1×32 nodes of the Cony layer 211 as a 32-dimensional vector, each of the nodes of the PrimeVN layer 221 obtains the vector output of that node by multiplying the vector by a transformation matrix. The transformation matrix is an element of a 1×1 kernel, and is updated by the learning of the machine learning model 201. It should be noted that it is possible to combine the processing of the Cony layer 211 and the PrimeVN layer 221 to configure these layers as a single primary vector neuron layer.

When the PrimeVN layer 221 is referred to as a "lower layer L," and the ConvVN1 layer 231 adjacent thereto at the upper side is referred to as an "upper layer L+1," the output of each of the nodes of the upper layer L+1 is decided using the following formulas.

$$v_{ij} = W_{ij}^L M_i^L \quad (2)$$

$$u_j = \sum_i v_{ij} \quad (3)$$

$$a_j = F(\|u_j\|) \quad (4)$$

$$M_j^{L+1} = a_j \times \frac{1}{\|u_j\|} u_j. \quad (5)$$

where,
$M^L_i$ represents the output vector of an i-th node in the lower layer L,
$M^{L+1}_i$ represents the output vector of a j-th node in the upper layer L+1,
$v_{ij}$ represents a prediction vector of the output vector $M^{L+1}_j$,
$W^L_{ij}$ represents a prediction matrix for calculating the prediction vector $v_{ij}$ from the output vector $M^L_i$ of the lower layer L,
$u_j$ represents a sum vector as a sum, namely a linear combination, of the prediction vectors $v_{ij}$,
$a_j$ represents an activation value as a normalized coefficient obtained by normalizing the norm $|u_j|$ of the sum vector $u_j$, and
F(X) represents a normalization function for normalizing X.

As the normalization function F(X), it is possible to use, for example, a formula (4a) or a formula (4b) described below.

$$a_j = F(\|u_j\|) = \text{softmax}(\|u_j\|) = \frac{\exp(\beta\|u_j\|)}{\sum_k \exp(\beta\|u_k\|)} \quad (4a)$$

$$a_j = F(\|u_j\|) = \frac{\|u_j\|}{\sum_k \|u_k\|}. \quad (4b)$$

where,
k represents an ordinal number with respect to all of the nodes of the upper layer L+1, and
β represents an adjustment parameter as an arbitrary positive coefficient, and is set to, for example, β=1

In the formula (4a) described above, the activation value $a_j$ can be obtained by normalizing the norm $|u_j|$ of the sum vector $u_j$ with the softmax function with respect to all of the nodes of the upper layer L+1. In contrast, in the formula (4b), the activation value $a_j$ can be obtained by dividing the norm $|u_j|$ of the sum vector $u_j$ by the sum of the norms $|u_j|$ related to all of the nodes of the upper layer L+1. It should be noted that it is possible to use other functions than the formula (4a) and the formula (4b) as the normalization function F(X).

The ordinal number i in the formula (3) described above is conveniently assigned to the node of the lower layer L to be used for deciding the output vector $M^{L+1}_j$ of the j-th node in the upper layer L+1, and takes values 1 through n. Further, the integer n represents the number of the nodes of the lower layer L to be used for deciding the output vector $M^{L+1}_j$ of the j-th node in the upper layer L+1. Therefore, the integer n is provided by the following formula.

$$n = Nk \times Nc \quad (6)$$

Where, Nk represents the number of elements of the kernel, and Nc represents the number of channels of the PrimeVN layer 221 as a lower layer. In the example shown in FIG. 3, since Nk=3, Nc=26 are set, n=78 is obtained.

One kernel to be used for obtaining the output vector of the ConvVN1 layer 231 has 1×3×26=78 elements taking the kernel size of 1×3 as a surface size, and the number of channels of the lower layer, namely 26, as the depth, and each of these elements corresponds to the prediction matrix $W^L_{ij}$. Further, in order to generate the output vectors of the 20 channels of the ConvVN1 layer 231, 20 sets of this kernel are necessary. Therefore, the number of the prediction matrixes $W^L_{ij}$ of the kernels to be used for obtaining the output vectors of the ConvVN1 layer 231 is 78×20=1560. These prediction matrixes $W^L_{ij}$ are updated by the learning of the machine learning model 201.

As is understood from the formulas (2) through (5) described above, the output vector $M^{L+1}_j$ of the individual node of the upper layer L+1 can be obtained by the following calculation.
(a) The prediction vector $v_{ij}$ is obtained by multiplying the output vector $M^L_i$ of each of the nodes of the lower layer L by the prediction matrix $W^L_{ij}$,
(b) then the sum vector $u_j$ as the sum, namely the linear combination, of the prediction vectors $v_i$ obtained from each of the nodes of the lower layer L is obtained,
(c) the activation value $a_j$ as the normalized coefficient is obtained by normalizing the norm $|u_j|$ of the sum vector $u_j$, and
(d) the sum vector $u_j$ is divided by the norm $|u_j|$, and is further multiplied by the activation value $a_j$.

It should be noted that the activation value $a_j$ is an normalized coefficient obtained by normalizing the norm $|u_j|$ with respect to all of the nodes of the upper layer L+1. Therefore, the activation value $a_j$ can be considered as an index representing a relative output intensity of each of the nodes in all of the nodes in the upper layer L+1. The norm used in the formula (4), the formula (4a), the formula (4b), and the formula (5) is an L2 norm representing the vector length in a typical example. On this occasion, the activation value $a_j$ corresponds to the vector length of the output vector $M^{L+1}_j$. The activation value $a_j$ is used only in the formula (4) and the formula (5) described above, and is therefore not required to be output from the node. It should be noted that it is possible to configure the upper layer L+1 so as to output the activation value $a_j$ to the outside.

The configuration of the vector neural network is substantially the same as the configuration of a capsule network, and the vector neuron of the vector neural network corresponds to a capsule of the capsule network. It should be noted that the calculation by the formulas (2) through (5) described above used in the vector neural network is different from the calculation used in the capsule network. The most significant difference between the both parties is a point that in the capsule network, the prediction vectors $v_{ij}$ on the right-hand side of the formula (3) described above are respectively multiplied by weights, and a search for the weights is performed by repeating dynamic routing a plurality of times. In contrast, in the vector neural network in the present embodiment, since the output vector $M^{L+1}{}_i$ can be obtained by calculating the formulas (2) through (5) described above once in sequence, there is an advantage that there is no need to repeat the dynamic routing, and thus, the calculation is higher in speed. Further, the vector neural network in the present embodiment has an advantage that an amount of memory necessary for the calculation is smaller than in the capsule network, and the amount of memory about ½ through ⅓ thereof is sufficient according to the experiment conducted by the inventors of the present disclosure.

In the point that the node input and output of which are each a vector is used, the vector neural network is the same as the capsule network. Therefore, the advantage of using the vector neuron is also common to the vector neural network and the capsule network. Further, the point that the higher the layer is, the larger area' feature the plurality of layers 211 through 251 represents, and the lower the layer is, the smaller area' feature the plurality of layers 211 through 251 represents is the same as in the normal convolution neural network. Here, the "feature" means a characteristic portion included in the input data to the neural network. The vector neural network and the capsule network are superior to the normal convolution neural network in the point that the output vector of a certain node includes space information representing spatial information as a feature expressed by that node. In other words, the vector length of the output vector of a certain node represents an existence probability of the feature expressed by that node, and the vector direction represents space information such as a direction and a scale of that feature. Therefore, the vector directions of the output vectors of two nodes belonging to the same layer represent a positional relationship between the respective features. Alternatively, it can be said that the vector directions of the output vectors of the two nodes represent a variation of the features. For example, in the case of a node corresponding to a feature of an "eye," it is possible for the direction of the output vector to represent a variation such as how narrow the eyes are, or how slant the eyes are. They say that in the normal convolution neural network, the space information of the feature disappears due to a pooling processing. As a result, the vector neural network and the capsule network have an advantage of being superior in performance of identifying the input data to the normal convolution neural network.

The advantage of the vector neural network can be conceived as follows. That is, in the vector neural network, there is an advantage in that the output vector of the node expresses the feature of the input data as the coordinates in a continuous space. Therefore, the output vector can be evaluated in such a manner that the features are similar to each other when the vector directions are close to each other. Further, there is also an advantage that even when the feature included in the input data cannot be covered by the training data, the feature can be discriminated by interpolation. In contrast, the normal convolution neural network has a disadvantage that the feature of the input data cannot be expressed as the coordinates in the continuous space since random compression is applied due to the pooling processing.

Since the output of each of the nodes of the ConvVN2 layer 241 and the ClassVN layer 251 is also decided in a similar manner using the formulas (2) through (5) described above, the detailed description will be omitted. The resolution of the ClassVN layer 251 as the uppermost layer is 1×1, and the number of channels is (n1+1).

The output of the ClassVN layer 251 is converted into the judgment values Class1-1 through Class1-2 with respect to the plurality of known classes, and the judgment value Class1-UN representing the unknown class. These judgment values are normally values normalized by the softmax function. Specifically, for example, by performing the calculation of obtaining the vector length of the output vector from the output vector of each of the nodes of the ClassVN layer 251, and further normalizing the vector length of each of the nodes with the softmax function, it is possible to obtain the judgment value with respect to the individual class. As described above, the activation value $a_j$ obtained by the formula (4) described above is a value corresponding to the vector length of the output vector $M^{L+1}{}_j$, and has already been normalized. Therefore, it is possible to output the activation value $a_j$ in each of the nodes of the ClassVN layer 251 to use the activation value $a_j$ as the judgment value for each of the classes without modification.

In the embodiment described above, as the machine learning models 201, 202, there is used the vector neural network for obtaining the output vector due to the calculation of the formulas (2) through (5) described above, but instead thereof, it is possible to use the capsule network disclosed in U.S. Pat. No. 5,210,798 and International Patent Publication No. WO 2019/083553. Further, it is also possible to use the neural network using only the scalar neurons.

Other Embodiments

The present disclosure is not limited to the embodiment described above, but can be implemented in a variety of aspects within the scope or the spirit of the present disclosure. For example, the present disclosure can also be implemented in the following aspect. The technical features in the embodiment described above corresponding to the technical features in each of the aspects described below can arbitrarily be replaced or combined in order to solve some or all of the problems of the present disclosure, or to achieve some or all of the advantages of the present disclosure. Further, the technical feature can arbitrarily be eliminated unless described in the present specification as an essential element.

(1) According to a first aspect of the present disclosure, there is provided a method of making a single processor or a plurality of processors perform classification processing of the classification target data using a machine learning model. This method includes (a) preparing N machine learning models in a memory assuming N as an integer no smaller than 2, wherein each of the N machine learning models is configured so as to classify input data into any one of a plurality of classes due to learning using training data, and is configured so as to have at least one class different from a class of another of the N machine learning models, and (b) performing the classification processing of the classification target data using the N machine learning models.

According to this method, since the classification processing is performed using the N machine learning models, it is possible to execute the processing at high speed compared to when performing the classification processing into a number of classes using a single machine learning model.

(2) In the method described above, an upper limit value may be set for a number of classes into which classification can be performed by any one machine learning model, and (a) the preparing the N machine learning models in the memory may include (a1) preparing a first machine learning model having an equal number of classes to the upper limit value in the memory, and (a2) adding, when judged that other input data belongs to an unknown class when making the single processor or the plurality of processors perform the classification processing on the other input data using the first machine learning model, a second machine learning model having a class corresponding to the other input data to the memory.

According to this method, it becomes possible to perform the classification into the class corresponding to the input data by adding the second machine learning model when the classification of the input data cannot be performed successfully using the first machine learning model.

(3) In the method described above, (a1) the preparing the first machine learning model in the memory may include performing learning of the second machine learning model using other training data including the other input data, the other training data may further include training data for performing learning related to at least one class included in the first machine learning model out of the training data.

According to this method, since learning of the second machine learning model is performed using existing training data for performing learning of the existing classes in addition to the training data for performing learning of the new class, it becomes possible to perform more accurate classification with the second machine learning model.

(4) In the method described above, an upper limit value may be set for a number of classes into which classification can be performed by any one machine learning model, (N−1) machine learning models out of the N machine learning models may have an equal number of classes to the upper limit value, the other machine learning model may have a smaller number of classes then the upper limit value, and (b) the performing the classification processing of the classification target data may include, when it is judged that the classification target data belongs to an unknown class when performing the classification processing on the classification target data using the N machine learning models, (b1) adding, when the other machine learning model has the smaller number of classes than the upper limit value, a new class corresponding to the classification target data by performing learning using training data including the classification target data with respect to the other machine learning model, and (b2) adding, when the other machine learning model has an equal number of classes to the upper limit value, a new machine learning model having a class corresponding to the classification target data.

According to this method, when the classification of the classification target data cannot successfully be performed using the N machine learning models, by adding a class to the existing machine learning model, or adding a new machine learning model, it becomes possible to perform the classification into the class corresponding to the classification target data.

(5) In the method described above, (b2) the adding the new machine learning model may include performing learning of the new machine learning model using still other training data including the classification target data judged to belong to the unknown class, the still other training data may further include training data for performing learning related to at least one class included in the N machine learning models out of the training data.

According to this method, since learning of the new machine learning model is performed using existing training data for performing learning of the existing classes in addition to the training data for performing learning of the new class, it becomes possible to perform more accurate classification with the new machine learning model.

(6) In the method described above, each of the N machine learning models may include a vector neural network having a plurality of vector neuron layers, and the method may further include preparing a known feature vector group which is obtained from at least one specific layer out of the plurality of vector neuron layers when the plurality of training data is input to the N machine learning models in which learning was completed, calculating a similarity representing which one of the plurality of classes the classification target data is similar to using a feature vector obtained from output of the specific layer when the classification target data is input into the N machine learning models, and the known feature vector group, and judging that the classification target data belongs to an unknown class when a result of the classification process by the N machine learning models fails to be consistent with the similarity.

According to this method, it is possible to confirm whether or not the result of the classification processing by the N machine learning models is correct using the similarity of the feature vector.

(7) In the method described above, the specific layer may have a configuration in which vector neurons arranged in a plane defined by two axes of a first axis and a second axis are arranged along a third axis in a different direction from directions of the two axes as a plurality of channels. The feature vector may be one of (i) a first type feature spectrum in which a plurality of element values of output vectors of the vector neuron in one plan position out of the specific layer is arranged over the plurality of channels along the third axis, (ii) a second type feature spectrum obtained by multiplying each of the element values of the first type feature spectrum by an activation value corresponding to a vector length of the output vector, and (iii) a third type feature spectrum in which the activation value in one plan position of the specific layer is arranged over the plurality of channels along the third axis.

According to this method, it is possible to easily obtain the feature vector.

(8) According to a second aspect of the present disclosure, there is provided an information processing device configured to perform the classification processing of the classification target data using the machine learning models. The information processing device includes a memory configured to store N machine learning models assuming N as an integer no smaller than 2, and a single processor or a plurality of processors configured to perform a calculation using the N machine learning models, wherein each of the N machine learning models is configured so as to classify input data into any of the plurality of classes with learning using training data, and is configured so as to have at least one class different from a class of another of the N machine learning models, and the single processor or the plurality of processors is configured so as to perform classification processing of the classification target data using the N machine learning models.

According to this information processing device, since the classification processing is performed using the N machine learning models, it is possible to execute the processing at high speed compared to when performing the classification processing into a number of classes using a single machine learning model.

(9) According to a third aspect of the present disclosure, there is provided a non-transitory computer-readable storage medium storing a computer program for making a single processor or a plurality of processors perform the classification processing of the classification target data using the machine learning models. The machine learning models include N machine learning models assuming N as an integer no smaller than 2, each of the N machine learning models is configured so as to classify input data into any one of a plurality of classes due to learning using training data, and is configured so as to have at least one class different from a class of another of the N machine learning models, and the computer program makes the single processor or the plurality of processors perform classification processing of the classification target data using the N machine learning models.

According to this computer program, since the classification processing is performed using the N machine learning models, it is possible to execute the processing at high speed compared to when performing the classification processing into a number of classes using a single machine learning model.

The present disclosure can be implemented in a variety of aspects other than the above. For example, it is possible to implement the present disclosure in an aspect such as a computer program for realizing the function of the classification device, or a non-transitory storage medium recording the computer program.

What is claimed is:

1. A method of making a single processor or a plurality of processors perform classification processing of classification target data using a machine learning model, the method comprising:
    (a) training a first machine learning model and a second machine learning model in a memory using first training data, wherein each of the first machine learning model and the second machine learning model has a plurality of classes to classify first input data, is configured to have at least one class different from each other, and has an upper limit value set for a number of classes,
    (b) obtaining second input data as the classification target data using a sensor,
    (c) performing the classification processing of the second input data using the first machine learning model and the second machine learning model at a same time,
    (d) determining whether the second input data belongs to a class within a plurality of classes of either the first machine learning model or the second machine learning model,
    (e) determining, when the second input data does not belong to the class within a plurality of classes of either the first machine learning model or the second machine learning model, whether the number of classes of either the first machine learning model or the second machine learning model is smaller than the upper limit value,
    (f) adding, based on the number of classes of the second machine learning model being smaller than the upper limit value, a new class corresponding to the second input data to the second machine learning model, and
    (g) adding a third machine learning model with the class corresponding to the second input data, based on both the number of classes of the first machine learning model and the number of classes of the second machine learning model being at the upper limit value, and training the third machine learning model using the second input data.

2. The method according to claim 1, wherein
    (h) adding the third machine learning model includes performing learning of the third machine learning model using second training data including the second input data, and
    the second training data further includes the first training data.

3. The method according to claim 1, wherein
    each of the first machine learning model and the second machine learning model includes a vector neural network having a plurality of vector neuron layers, and
    (a) the training includes (a1) preparing a known feature vector group which is obtained from at least one specific layer out of the plurality of vector neuron layers when the first training data is input to the first machine learning model and the second machine learning model, and
    (d) the determining includes,
        (d1) calculating a similarity representing that a feature vector of the second input data obtained from output of the specific layer is similar to the known feature vector group, and
        (d2) determining that the second input data does not belong to the class within a plurality of classes of either the first machine learning model or the second machine learning model, when the feature vector of the second input data differs from the known feature vector group.

4. The method according to claim 3, wherein
    the specific layer has a configuration in which vector neurons arranged in a plane defined by two axes of a first axis and a second axis are arranged along a third axis in a different direction from directions of the two axes as a plurality of channels,
    the feature vector is one of
        (i) a first type feature spectrum in which a plurality of element values of output vectors of the vector neuron in one plan position out of the specific layer is arranged over the plurality of channels along the third axis,
        (ii) a second type feature spectrum obtained by multiplying each of the element values of the first type feature spectrum by an activation value corresponding to a vector length of the output vector, and
        (iii) a third type feature spectrum in which the activation value in one plan position of the specific layer is arranged over the plurality of channels along the third axis.

5. An information processing device configured to perform classification processing of classification target data using a machine learning model, comprising:
    training a first machine learning model and a second machine learning model in a memory using first training data,
    a memory configured to store the first machine learning model and the second machine learning model, wherein each of the first machine learning model and the second machine learning model has a plurality of classes to classify first input data using first training data, is configured to have at least one class different from each other, and has an upper limit value set for a number of classes,
    a sensor that obtains second input data as the classification target data, and
    a single processor or a plurality of processors configured to perform the classification processing of the second input data using the first machine learning model and the second machine learning model at a same time, wherein the single processor or the plurality of processors is configured to determine whether the second input data belongs to a class within a plurality of classes of either the first machine learning model or the second machine learning model, the single processor or the plurality of processors is configured to determine, when the second input data does not belong to the class within a plurality of classes of either the first machine learning model or the second machine learning model, whether the number of classes of either the first machine learning model or the second machine learning model is smaller than the upper limit value, the single processor or the plurality of processors is configured to add, based on the number of classes of the second machine learning model being smaller than the upper limit value, a new class corresponding to the second input data to the second machine learning model, and the single processor or the plurality of processors is configured to add a third machine learning model with the class corresponding to the second input data, based on both the number of classes of the first machine learning model and the number of classes of the second machine learning model being at the upper limit value, and training the third machine learning model using the second input data.

6. A non-transitory computer-readable storage medium storing a computer program making a single processor or a plurality of processors perform classification processing of classification target data using either a first machine learning model or a second machine learning model, wherein each of the first machine learning model and the second machine learning model has a plurality of classes to classify first input data using first training data, is configured to have at least one class different from each other, and has an upper limit value set for a number of classes, the computer program comprising:

training a first machine learning model and a second machine learning model in a memory using the first training data, obtaining second input data as the classification target data using a sensor, performing the classification processing of the second input data using the first machine learning model and the second machine learning model at a same time, determining whether the second input data belongs to a class within a plurality of classes of either the first machine learning model or the second machine learning model, determining, when the second input data does not belong to the class within a plurality of classes of either the first machine learning model or the second machine learning model, whether the number of classes of either the first machine learning model or the second machine learning model is smaller than the upper limit value, adding, based on the number of classes of the second machine learning model being smaller than the upper limit value, a new class corresponding to the second input data to the second machine learning model, and adding a third machine learning model with the class corresponding to the second input data, based on both the number of classes of the first machine learning model and the number of classes of the second machine learning model being at the upper limit value, and training the third machine learning model using the second input data.

* * * * *